(12) United States Patent
Chern et al.

(10) Patent No.: US 7,874,869 B2
(45) Date of Patent: Jan. 25, 2011

(54) RECONFIGURABLE PATCH PANEL

(75) Inventors: Michael Chern, San Jose, CA (US);
Saeed Seyed, Los Altos Hills, CA (US);
Tung Po Yang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/411,444

(22) Filed: Mar. 26, 2009

(65) Prior Publication Data

US 2010/0248535 A1 Sep. 30, 2010

(51) Int. Cl.
*H01R 13/73* (2006.01)
*H02B 1/01* (2006.01)
(52) U.S. Cl. .................................. 439/544; 439/540.1
(58) Field of Classification Search ................. 439/544, 439/540.1, 534, 713
See application file for complete search history.

(56) References Cited

U.S. PATENT DOCUMENTS

| | | | | |
|---|---|---|---|---|
| 5,639,261 A | * | 6/1997 | Rutkowski et al. .......... | 439/534 |
| 6,537,106 B1 | * | 3/2003 | Follingstad ................. | 439/534 |
| 7,335,056 B1 | * | 2/2008 | Clark et al. .............. | 439/540.1 |
| 7,357,667 B2 | * | 4/2008 | Clark et al. .............. | 439/540.1 |
| 7,455,548 B2 | * | 11/2008 | Clark et al. ................. | 439/534 |
| 7,591,677 B2 | * | 9/2009 | Bade et al. ............... | 439/540.1 |
| 2005/0112939 A1 | * | 5/2005 | Grzegorzewska et al. ... | 439/534 |
| 2007/0298652 A1 | * | 12/2007 | Clark et al. .............. | 439/540.1 |
| 2009/0068881 A1 | * | 3/2009 | Patchett .................... | 439/540.1 |

\* cited by examiner

*Primary Examiner*—Hae Moon Hyeon

(57) ABSTRACT

A reconfigurable patch panel and a method of reconfiguring a patch panel comprising a support member supporting at least one adapter, where the at least one adapter comprises a plurality of ports for coupling to electric signal bearing cables. A pivot, associated with each of the at least one adapters, couples the at least one adapter to the support member. The at least one adapter selectively rotates about the pivot to a selected position relative to the support member. A retainer, associated with each of the at least one adapters, couples the support member to the at least one adapter and retains the at least one adapter in the selected position.

23 Claims, 8 Drawing Sheets

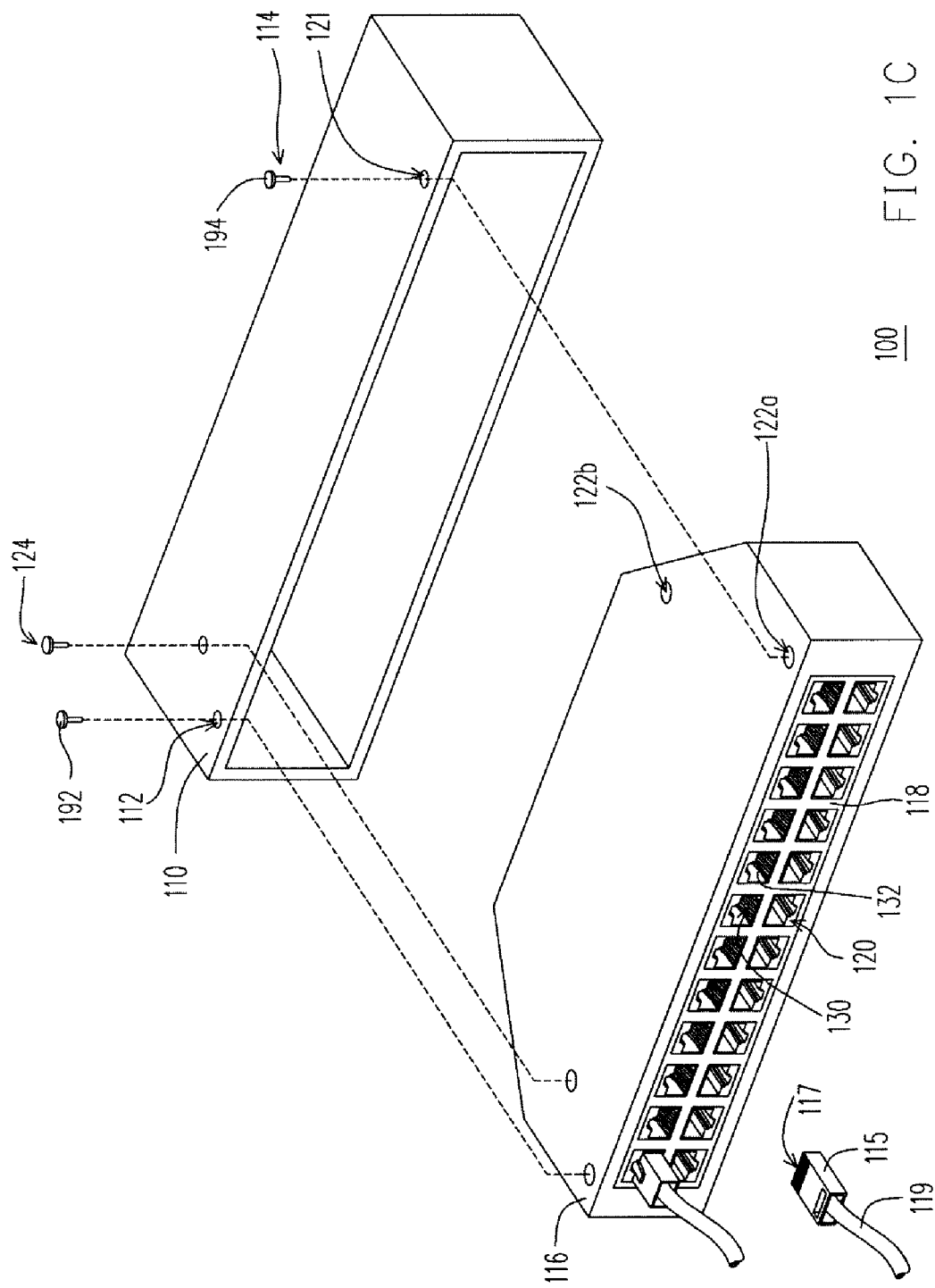

RECONFIGURABLE PATCH PANEL

BACKGROUND

1. Technical Field

Embodiments of the present invention generally relate to patch panels for use with electronic equipment and, more particularly, to a patch panel that may be reconfigured from one position to another to, for example, accommodate particular space and/or cabling constraints.

2. Background of the Related Art

Communications and computer systems commonly include spatially separate electronic equipment that may be interconnected using one or more cables ("inter-equipment cables"). In general, each inter-equipment cable is terminated to the equipment via a patch panel.

The patch panel may include a physical interface that allows signals to be exchanged among the electronic equipment and the inter-equipment cables. This physical interface generally includes two sets of ports, namely, first and second sets of ports. The first set of ports is adapted, configured, operated, or otherwise constructed (collectively "adapted") to terminate the inter-equipment cables, and the second set of ports is adapted to terminate one or more cables interconnecting the communications equipment and the patch panel ("intra-equipment cables"). In addition to the ports, the patch panel includes a number of electrical interconnects (e.g., wires, traces, etc.) that are adapted to appropriately interconnect the first and second sets of ports. In a typical patch panel used for data communication, the ports are female RJ-45 connectors, the intra-equipment cables are CAT-5 cables terminated with male RJ-45 connectors. Using a patch panel, the signals exchanged among the electronic equipment and the inter-equipment cables pass between the first set of ports, the electrical interconnects, the second set of ports, and the intra-equipment cables. The interconnections amongst equipment can be reconfigured as needed through rearrangement of the intra-equipment cabling.

In some environments, sets of the electronic equipment (e.g., communications equipment, computer equipment and the like) may be arranged in respective equipment racks. Advantages of arranging the sets of electronic equipment as such include minimizing or effectively utilizing floor space occupied by such equipment, reducing lengths of the inter-equipment cables, logically collocating one or more pieces of the electronic equipment, and so on. In some instances, the racks may be positioned proximate to one another. As such, adhering to proper cable management paradigms is important for (i) efficiently routing the inter-equipment cables to minimize or effectively utilize space occupied by such cables, (ii) preventing damage or unexpected displacement of the inter-equipment cables, (iii) avoiding excessive cable bending or other external forces that may damage the inter-equipment cables and/or their associated terminations.

To facilitate cable management, patch panels are fabricated in distinct configurations. One form of patch panel is planar, where all the ports are arranged in one or more rows in a single plane. Another form of patch panel may have the one or more rows of ports arranged on a pair of subpanels that are angled with respect to one another. Since these are fixed patch panel configurations, a technician must select a particular panel configuration when designing the cabling system. If a different configuration is needed at a later time, the entire patch panel must be replaced.

Therefore, there is a need in the art for a patch panel that may be reconfigured from one position to another to, for example, accommodate particular space and/or cabling constraints, and/or adhere to proper cable management paradigms.

BRIEF DESCRIPTION OF THE DRAWINGS

So the manner in which the above recited features are attained and can be understood in detail, a more detailed description is described below with reference to Figures illustrated in the appended drawings.

The Figures in the appended drawings, like the detailed description, describe examples and embodiments of the invention. As such, the Figures and the detailed description are not to be considered limiting, and other equally effective examples are possible and likely. Furthermore, like reference numerals in the Figures indicate like elements, and wherein:

FIG. 1C is a dissembled view of the patch panel of FIGS. 1A and 1B;

DESCRIPTION OF EXAMPLE EMBODIMENTS

Overview

Embodiments of the invention include a reconfigurable patch panel comprising a support member supporting at least one adapter, where the at least one adapter comprises a plurality of ports for coupling to electric signal bearing cables. A pivot, associated with each of the at least one adapters, couples the at least one adapter to the support member. The at least one adapter selectively rotates about the pivot to a selected position relative to the support member. A retainer, associated with each of the at least one adapters, couples the support member to the at least one adapter and retains the at least one adapter in the selected position.

Another embodiment of the invention includes a method of reconfiguring a patch panel comprising releasing a retainer coupling an adapter to a support member and retaining the adapter in a first position with respect to the support member, where the adapter comprises a plurality of ports for coupling to electric signal bearing cables; pivoting the adapter about a pivot with respect to the support member into a second position; and reengaging the retainer to retain the adapter in the second position.

Detailed Description

Figure 1A:
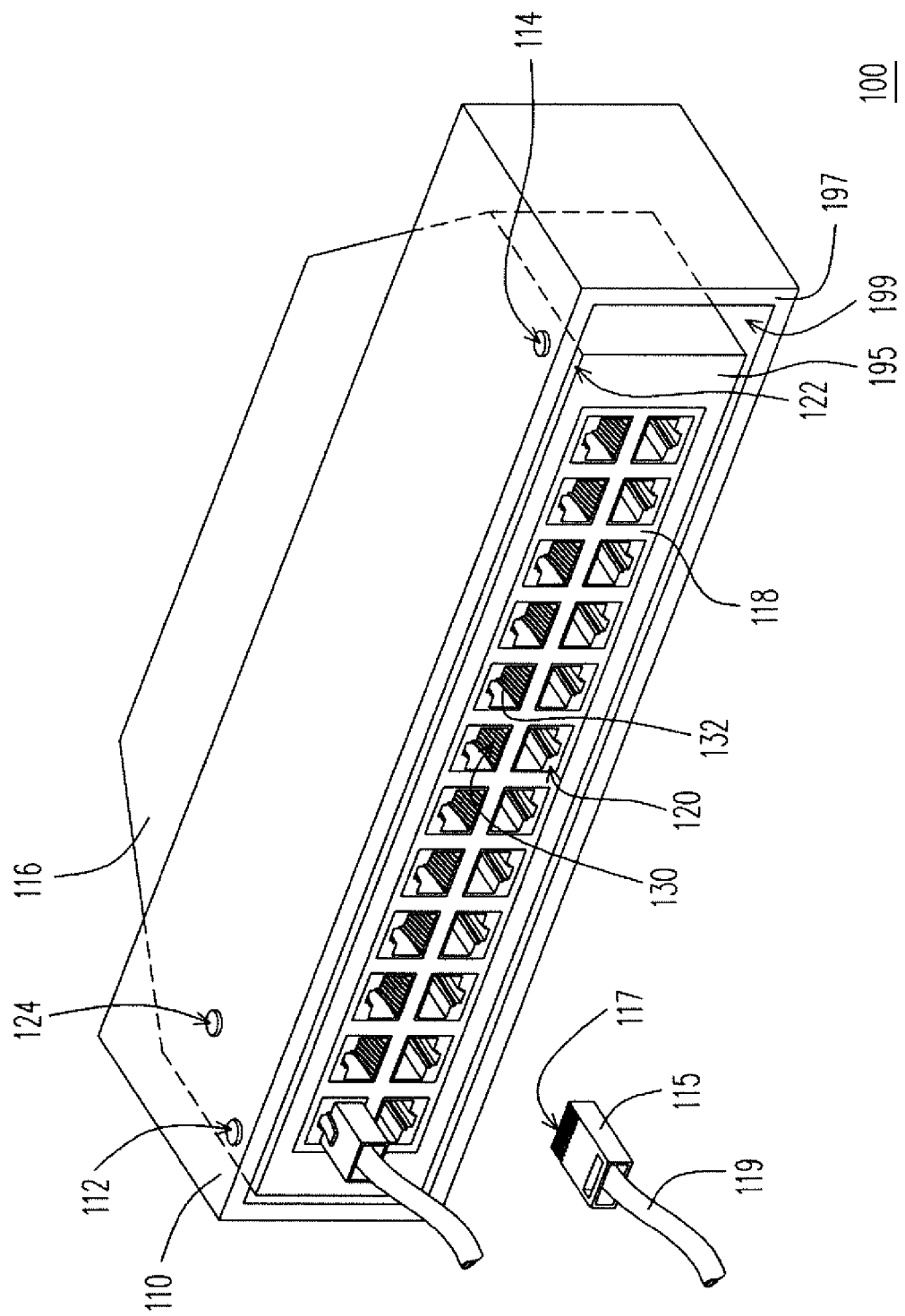
FIG. 1A is a perspective view of a patch panel in a non-extended state in accordance with an embodiment of the invention.
Figure 1B:
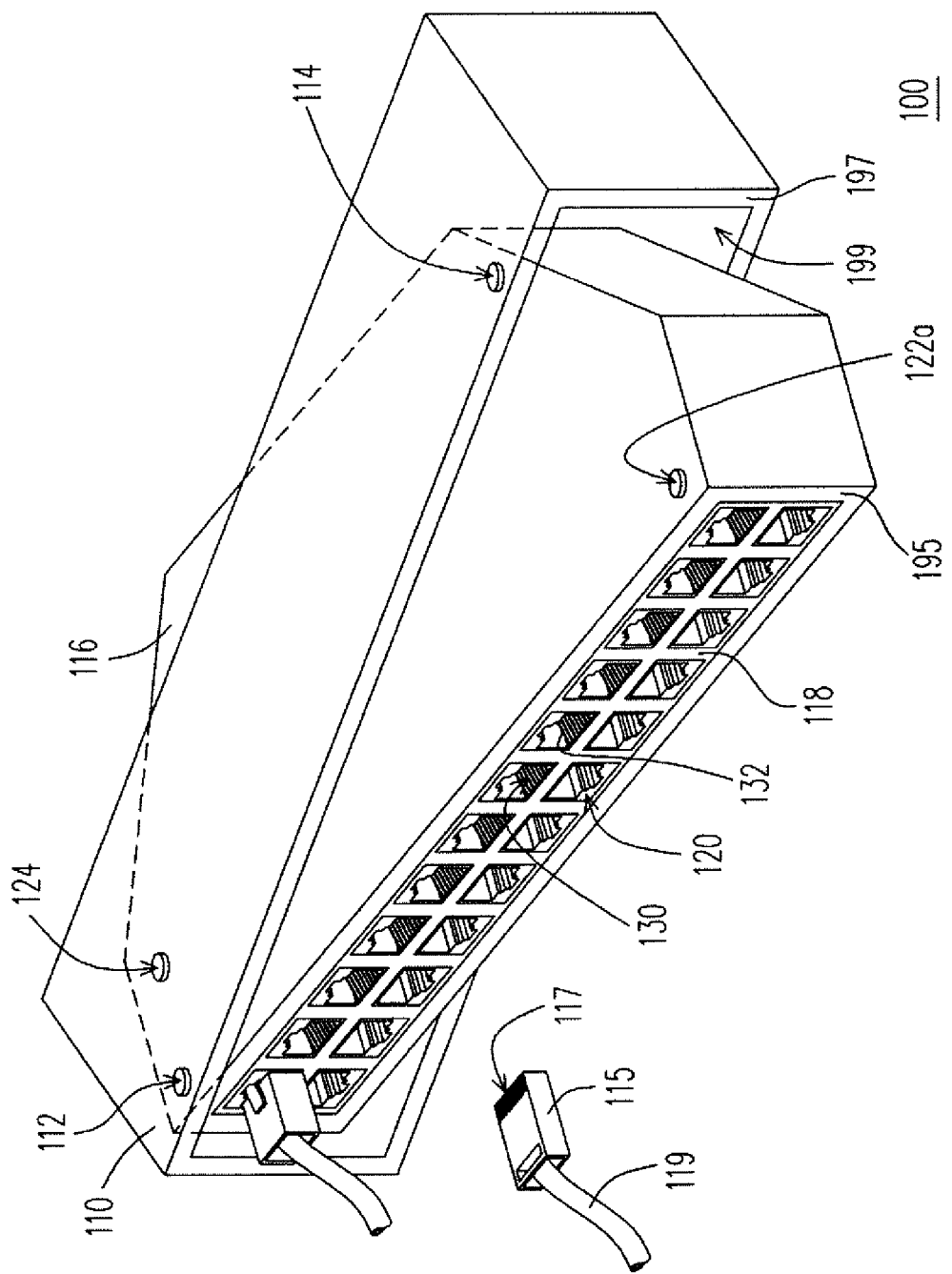
FIG. 1B is a perspective view of a patch panel in an extended state in accordance with an embodiment of the invention.

FIGS. 1A, 1B and 1C depict a perspective view of an embodiment of the invention in two operational configuration states as well as a dissembled state. Specifically, FIG. 1A is a diagram illustrating an embodiment of the patch panel in a non-extended state. FIG. 1B is a diagram illustrating an embodiment of the patch panel in an extended state. FIG. 1C is a disassembled view of an embodiment of the patch panel of FIGS. 1A and 1B.

Referring to FIGS. 1A-1C, the patch panel 100 is typically used with electronic equipment such as one or more line cards, data storage devices, data routing devices, computers and the like. The patch panel of the present invention electrically operates to provide connectivity between ports in the same manner as a conventional patch panel. The patch panel 100 comprises a support member 110 (e.g., a frame) and an adapter 116 pivoting with respect to the support member 110 about a pivot point, for example, pivot 112. The adapter 116 provides an electrical interface 118 between the communications equipment and signals carried by one or more electrical cables 119. More specifically, the electrical interface 118 may comprise one or more ports 120 adapted to accept at least one modular jack 115 having at least one electrical contact 117. In the depicted embodiment, the modular jack 115 is shown as an RJ45 connector provided with eight pin contacts 117 while the one or more ports 120 can be a corresponding RJ45 socket to accept the RJ45 jack 115. Of course, any form of jack (male connector) and socket (female connector) may be used. In other embodiments of the invention, the specific electrical port type can be of any type or a combination of types.

Figure 1D:
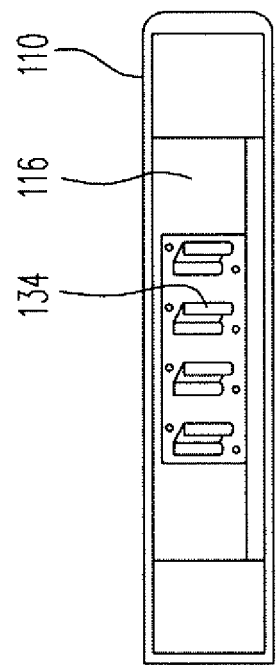
FIG. 1D is a back view of the patch panel in the non-extended state of FIG. 1A.
Figure 1E:
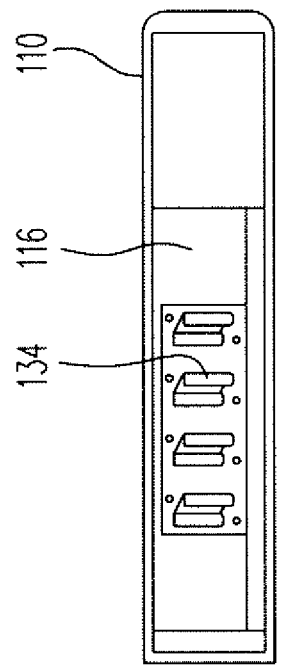
FIG. 1E is a back view of the patch panel in the extended state of FIG. 1B.

Furthermore, the electrical interface 118 also comprises one or more electrical interconnects 130 in the adapter 116 for communicatively coupling the electrical contacts 117 to the electronic equipment. The one or more electrical interconnects 130 can be formed in accordance with a standardized electrical interface to provide an electrical path between the modular jack 115 of the one or more electrical cables 119 and a termination on the backside of the adapter 116 (e.g., MRJ21). FIG. 1D further shows a back view of the patch panel 100 in the non-extended state of FIG. 1A. FIG. 1E further shows a back view of the exemplary patch panel in the extended state of FIG. 1B. Referring to FIGS. 1A-1E, specifically, the aforementioned electrical interconnect 130 may include pins 132 in the socket 120, pins 134 on the backside of the adapter 116, and wires or traces (not shown, but well known in the art) in the adapter 116 for electrically connecting the pins 132 in the socket 120 to the pins 134 on the backside of the adapter 116.

The support member 110 has at least one pivot 112 and at least one retainer 114. The support member 110 supports the adapter 116 in a rectangular opening 199. The support member 110 may be a portion of an equipment rack, a component that is installed in an equipment rack, or a stand-alone structure. Herein, FIGS. 1A-1C show an embodiment having the support member 110 with one pivot 112 and one retainer 114 coupled to one adapter 116. The adapter 116 pivots about the pivot 112 while being retained in the support member 110 in either the configuration states of FIG. 1A or FIG. 1B. The retainer 114 is utilized to selectively retain the adapter 116 in a particular configuration state. In one embodiment, the retainer 114 is adapted to releasably fix the adapter 116 in at least one position (a configuration state).

According to the embodiment shown in FIGS. 1A-1C, the retainer 114 comprises a through hole 121 located in the support member 110, a first fastener portion 194 (e.g., a screw) and a second fastener portion 122 (e.g., a screw hole). In the depicted embodiment, the fastener portion 122 comprises two screw holes 122a and 122b located in the adapter 116. Furthermore, a screw 192 forms the pivot 112 coupling the support member 110 to the adapter 116. Alternatively, a spring-loaded ball or pin coupled to a detent or hole may form the pivot 112, the retainer 114 or both.

The adapter 116 has a top plan form that enables the adapter to be pivoted with respect to the support member 110. In the depicted embodiment of FIGS. 1A-1C, the adapter 116 has shape resembling a rectangular with two corners (the back corners) removed. For operation, only one corner, the corner distal from the pivot, need be removed to provide clearance between the adapter 116 and the support member 110. In this manner, the adapter 116 can freely pivot without impacting the support member 110. Having a "corner-clipped" rectangular top plan form is only one way of providing clearance. In other embodiments, the support member may have an open side, the adapter may have rounded corners, and the like. It is contemplated that any design that accommodates pivoting the adapter with respect to the support member is within the scope of the present invention.

In FIG. 1A, the adapter 116 is located in a first position by forming the fastener using a first fastener portion 194 (e.g., a screw) coupled to second fastener portion 122a (e.g., a threaded hole). This combination places the patch panel 100 in the non-extended state with respect to the support member 110 (i.e., a plane formed by a front 195 of the adapter 116 is substantially coplanar with a front edge 197 of the support member 110). To reconfigure the patch panel 100 from the non-extended state of FIG. 1A to the extended state of FIG. 1B, the fastener 192 is loosened to form the pivot 112 while first fastener portion 194 is removed. Then, the adapter 116 can be rotated from the first position (FIG. 1A) to a second position (FIG. 1B) about the pivot 112. The fastener 192 is then fastened, and the removed first fastener portion 194 is replaced using the second fastener portion 122b to fix the adapter 116 to the support member 110. With this combination, the patch panel 100 is in the extended state of FIG. 1B (i.e., the plane of the front 195 of the adapter 116 is angled with respect to the front of the support member 110). Reverse steps can be further performed for reconfigure the patch panel 100 from the extended state of FIG. 1B back to the non-extended state of FIG. 1A.

Moreover, the support member 110 may further comprise at least one other retainer 124. The at least one other retainer 124 provides the same function as the retainer 114, to releasably fix the adapter 116 in at least one position (e.g., the first and second positions) while converting the patch panel 100 from the non-extended state of FIG. 1A to the extended state of FIG. 1B.

However, it is noted that the retainer 114, the at least one other retainer 124, or the at least one corresponding fastener portion 122 may be any mechanism for releasably affixing (e.g., latching) the adapter 116 to the support member 110, whether in the non-extended state or in the extended state. The mechanism used to implement the retainer does not have to be a screw and a corresponding screw hole. Instead, the retaining mechanism can be a spring-loaded element (e.g., a pin or ball) coupled to an element receptor (e.g., a hole or detent). In other words, the retainer can also include two portions, where the first portion is, for example, a spring loaded element in the adapter 116 (or the support member 110), and the second portion can be an element receptor in the support member 110 (or the adapter 116). Alternatively, the first portion may be a tapped hole in the adapter 116, and the second portion may be the hole in the support member 110, wherein each of the first and second portions includes respective parts of the screw as being assembled.

Furthermore, the retaining mechanism can also be any combination of mechanisms for releasably affixing the adapter 116 to the support member 110, whether in the non-extended state or in the extended state. The retaining mechanism may include, for example, first and second retaining mechanisms. Each of the first and second retaining mechanisms may be any of the mechanisms mentioned above.

Figure 2A:
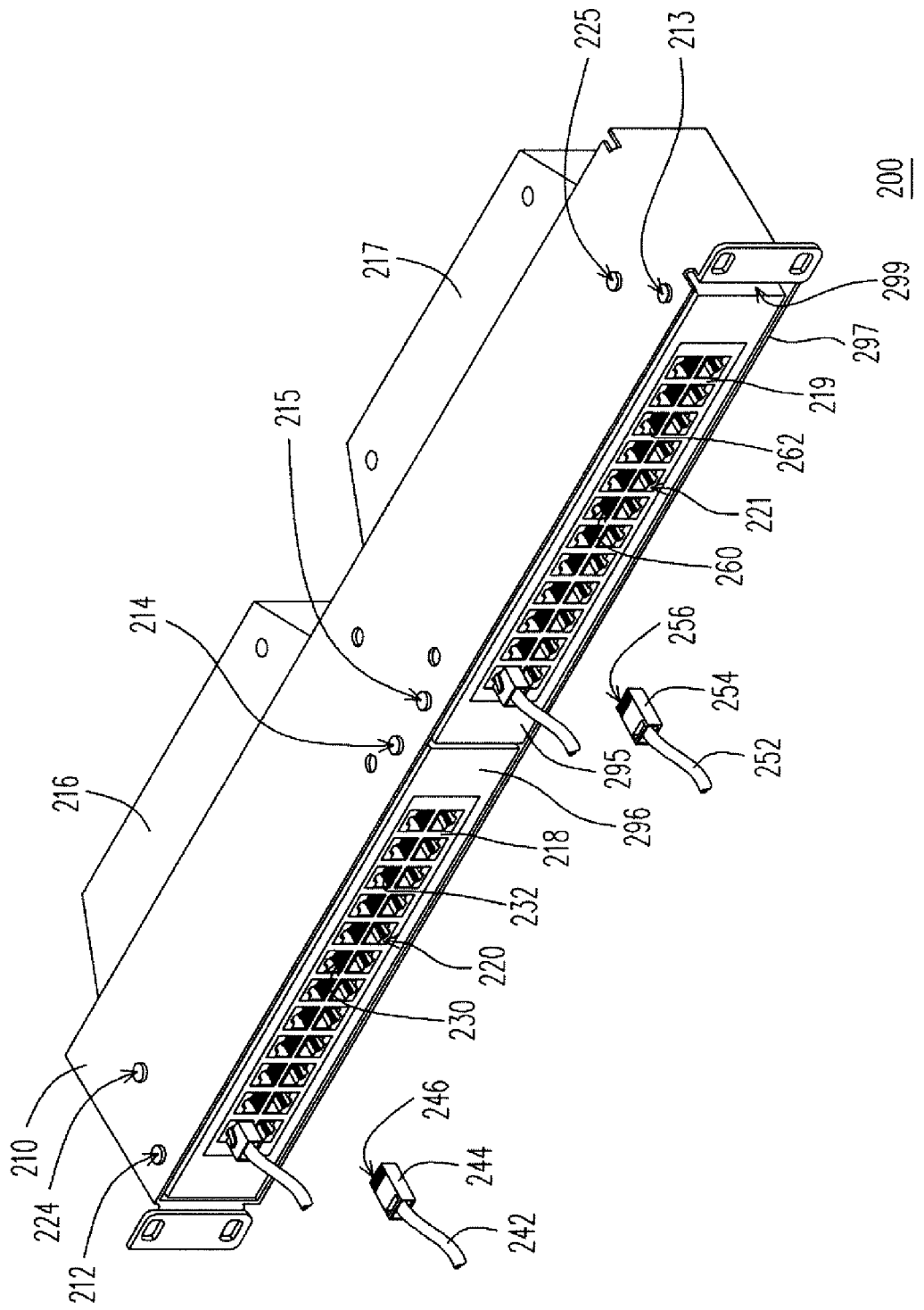
FIG. 2A is a perspective view of a patch panel in a non-extended state in accordance with an alternative embodiment of the invention.
Figure 2B:
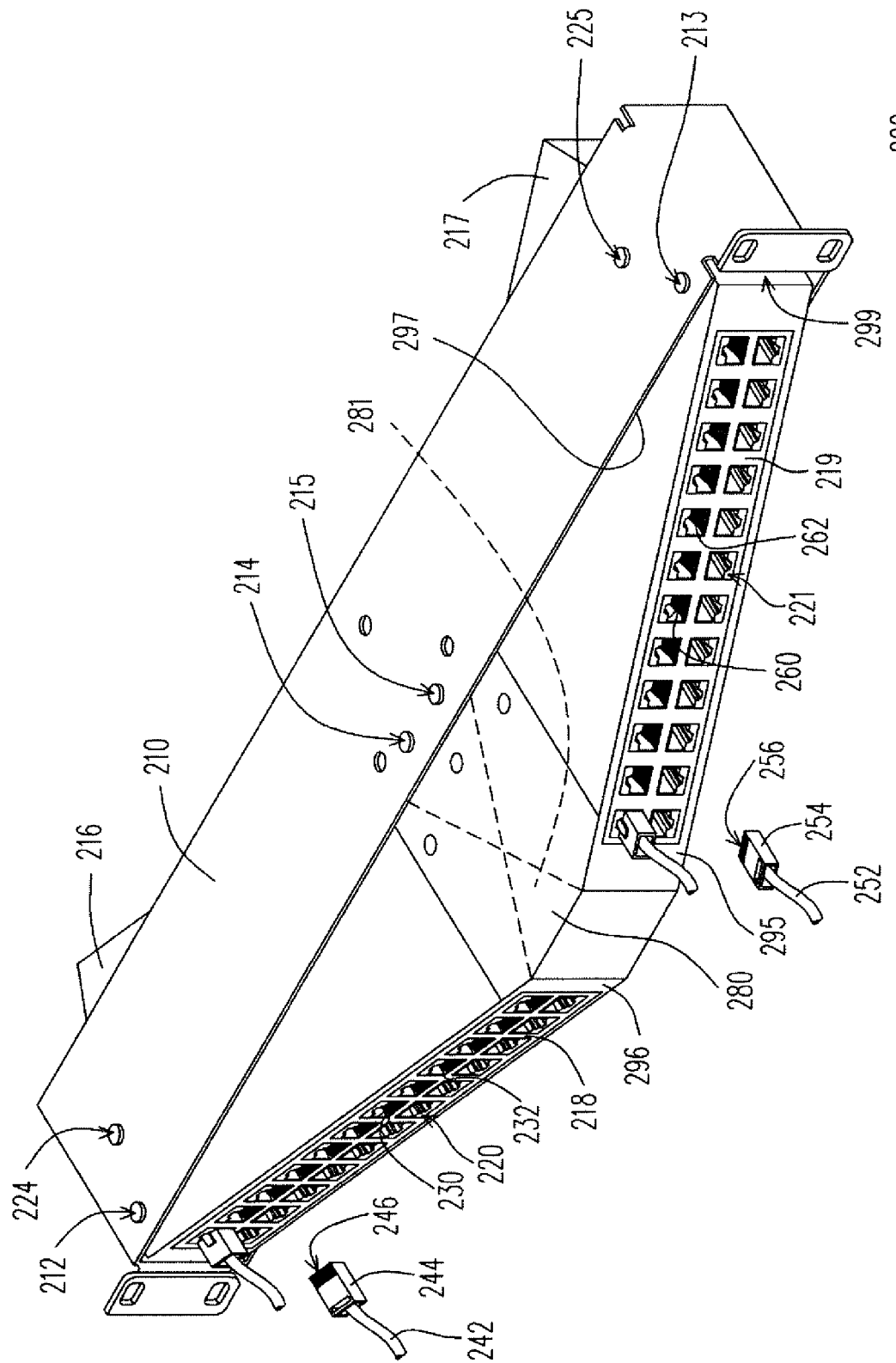
FIG. 2B is a perspective view of a patch panel in an extended state in accordance with an alternative embodiment of the invention.
Figure 2C:
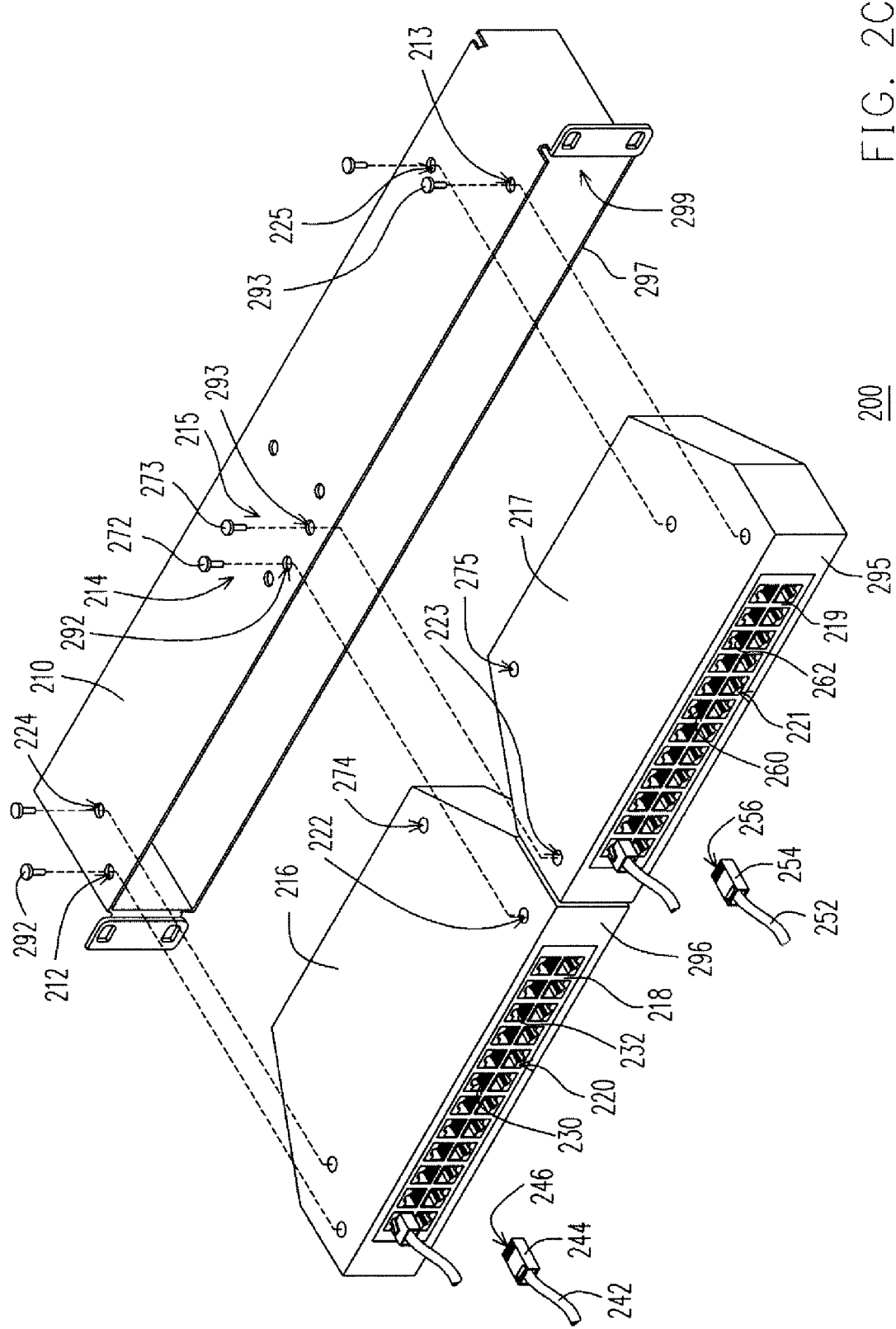
FIG. 2C is a dissembled view of the patch panel of FIGS. 2A and 2B.

The foregoing embodiment of the invention shows a patch panel 100 provided with an adapter pivoted on a support member; however, the number of adapters within the reconfigurable patch panel of the present invention is not limited to a single adapter. Another embodiment of the reconfigurable patch panel having more than one adapter is described with respect to FIGS. 2A-2E and the accompanying description. Specifically, FIG. 2A is a perspective view of an alternative embodiment of a reconfigurable patch panel in a non-extended state. FIG. 2B is a perspective view of the embodiment of the reconfigurable patch panel of FIG. 2A in an extended state. FIG. 2C is a disassembled view of the alternative embodiment of the reconfigurable patch panel of FIGS. 2A and 2B.

Figure 2D:
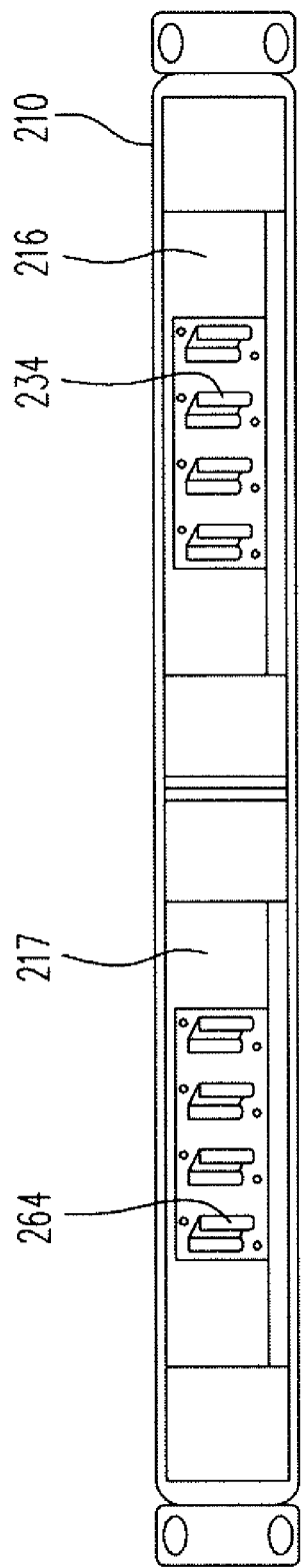
FIG. 2D is a back view of the patch panel in the non-extended state of FIG. 2A.
Figure 2E:
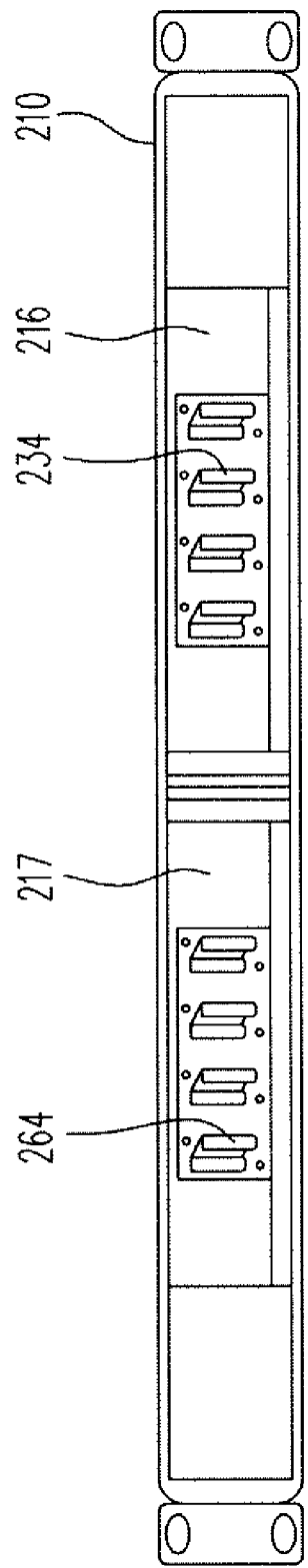
FIG. 2E is a back view of the patch panel in the extended state of FIG. 2B.

Referring to FIGS. 2A-2C, a reconfigurable patch panel 200 is used with communications and/or computer equipment in the same manner as discussed above . . . . The patch panel 200 comprises a support member 210 (e.g., a frame), a first adapter 216 and a second adapter 217. The support member 210 has a first pivot 212, a second pivot 213, a first retainer 214 and a second retainer 215. The first adapter 216 provides a first electrical interface 218 between the electronic equipment and at least one first signal carried by a first electrical cable 242. More specifically, the first electrical interface 218 may comprise one or more first ports 220 adapted to accept at least one first modular jack 244 having at least one first electrical contact 246. In the depicted embodiment, the first modular jack 244 is shown as an RJ45 connector provided with eight pin contacts 246 while the one or more first ports 220 can be a corresponding RJ45 socket to accept the RJ45 jack 244. Of course, any form of jack (male connector) and socket (female connectors) may be used. In other embodiments of the invention, the specific electrical port type can be of any type or a combination of types Furthermore, the first electrical interface 218 may further comprise one or more first electrical interconnects 230 in the first adapter portion 216 for communicatively coupling the first electrical contacts 246 to the electronic equipment. The first electrical interface 218 can be formed in accordance with a standardized electrical interface to provide an electrical path between the first modular jack 244 of the first electrical cable 242 and a termination on the backside of the first adapter portion 216 (e.g., MRJ21). FIG. 2D further shows a back view of the patch panel 200 in the non-extended state of FIG. 2A. FIG. 2E further shows a back view of the exemplary patch panel in the extended state of FIG. 2B. Referring to FIGS. 2A-2E, the aforementioned first electrical interconnect 230 may include pins 232 in the socket 220, pins 234 on the backside of the first adapter portion 216, and wires or traces (not shown, but well known in the art) in the first adapter portion 216 for electrically connecting the pins 232 in the socket 220 to the pins 234 on the backside of the first adapter portion 216.

The second adapter portion 217 is adapted to provide a second electrical interface 219 between the communications equipment and at least one first signal carried by a second electrical cable 252. More specifically, the second electrical interface 219 may comprise one or more second ports 221 adapted to accept at least one second modular jack 254 having at least one second electrical contact 256. Herein, the second modular jack 254 is shown as an RJ45 connector provided with eight pin contacts 256 while the one or more second ports 221 can be a corresponding RJ45 socket to accept the RJ45 jack 254. Of course, any form of jack (male connector) and socket (female connectors) may be used. In other embodiments of the invention, the specific electrical port type can be of any type or a combination of types.

Furthermore, the second electrical interface 219 may further comprise one or more second electrical interconnects 260 in the second adapter portion 217 for communicatively coupling the second electrical contacts 256 to the electronic equipment. The second electrical interface 219 can be formed in accordance with a standardized electrical interface to provide an electrical path between the first modular jack 254 of the second electrical cable 252 and a termination on the backside of the second adapter portion 217 (e.g., MRJ21). Referring to FIGS. 2A-2E, the aforementioned second electrical interconnect 260 may include the pins 262 in the socket 220, the pins 264 on the backside of the first adapter portion 216, and the wires or traces (not shown, but well known in the art) in the first adapter portion 216 for electrically connecting the pins 262 in the socket 220 to the pins 264 on the backside of the first adapter portion 216.

The support member 210 of this embodiment has two pivots 212 and 213 and two retainers 214 and 215 for being respectively coupled with the adapters 216 and 217. The support member 210 supports the adapters 216 and 217 in a rectangular opening 299. The support member 210 may be a portion of an equipment rack, a component that is installed in an equipment rack, or a stand-alone structure. The first and second adapters 216 and 217 pivot about the first and second pivots 212 and 213 while being retained to the support member 210 by the first and second retainers 214 and 215, respectively. Each retainer 214 and 215 comprises a first fastener portion 272/273 (e.g., a screw), a second fastener portion 222/223 (e.g., a threaded hole), and a through hole 292/293. The retainers 214 and 215, releasably fix (e.g., latch) the first and second adapter portions 216, 217 in any of the first and second positions (i.e., extended or non-extended).

To reconfigure the patch panel, the retainers 214 and 215 are disengaged from the adapters 216 and 217, the adapters 216 and 217 are pivoted to a new position, and the retainers 214 and 215 are reengaged with the adapters 214 and 215. More specifically, in FIG. 2A, the adapters 216 and 217 are located in a first position by forming the fastener using a first fastener portion 272, 273 (e.g., screws) coupled to second fastener portion 222, 223 (e.g., threaded holes). This combination places the patch panel 200 in the non-extended state with respect to the support member 210 (i.e., a plane formed by each respective front 295 and 296 of the adapters 216 and 217 is substantially coplanar with a front edge 297 of the support member 210). To reconfigure the patch panel 200 from the non-extended state of FIG. 2A to the extended state of FIG. 2B, the fasteners 292 and 293 are loosened to form the pivot while first fastener portions 272, 273 are removed or otherwise disengaged. Then, the adapters 216 and 217 can be rotated from the first position (FIG. 2A) to a second position (FIG. 2B) about the respective pivots 212 and 213. The fasteners 292 and 293 are then fastened, and the removed first fastener portions 272 and 273 are replaced using the second fastener portions 274 and 275 to fix the adapters 216 and 217 to the support member 210. With this combination, the patch panel 200 is in the extended state of FIG. 2B (i.e., the planes of the respective fronts 295 and 296 of the adapters 216 and 217 are angled with respect to the front of the support member 110 and forming an obtuse angle with respect to each of the fronts of the adapters 216 and 217). Reverse steps can be further performed for reconfigure the patch panel 200 from the extended state of FIG. 2B back to the non-extended state of FIG. 2A.

As with the embodiment of FIGS. 1A-1C, the adapters 216 and 217 have a top plan form that facilitates rotation of the adapters 216 and 217 about their respective pivots 212 and 213 with respect to the support member 210 without the adapters 216 and 217 interfering with rotation of each other. The various embodiments available to facilitate rotation of the adapter of the embodiment of FIGS. 1A-1C are applicable to the embodiment of FIGS. 2A-2C.

The support member 210 may further comprise at least one first other retainer 224 and at least one second other retainer 225 respectively corresponding to the first adapter 216 and the second adapter 217, to provide the same function as the first retainer 214 and the second retainer 215, to releasably fix the first adapter 216 and the second adapter 217 in at least one position (e.g., the first and second positions) while converting the patch panel 200 from the non-extended state of FIG. 2A to the extended state of FIG. 2B.

Furthermore, the retainers 214, 215 or the other retainers 224, 225 may be any mechanism as mentioned in the above embodiment for releasably affixing (e.g., latching) the adapters 216, 217 to the support member 110, whether in the non-extended state or in the extended state. The retaining mechanism does not have to be screws and corresponding threaded holes as shown in FIG. 2C. Instead, the retaining mechanism can be a combination of a spring-loaded element (e.g., pin or ball) in the adapters 216, 217 (or the support member 210), and an element receptor (e.g., a hole or detent) in the support member 210 (or the adapters 216, 217). Alternatively, the first fastener portion may be a tapped hole in the adapters 216, 217, and the second fastener portion may be the hole in the support member 210, wherein each of the first and second portions includes respective parts of the screws as being assembled.

Moreover, the retaining mechanism can also be any combination of mechanisms for releasably affixing the adapters 216, 217 to the support member 210, whether in the non-extended state or in the extended state. The retaining mechanism may include, for example, first and second retaining mechanisms. Each of the first and second retaining mechanisms may be any of the mechanisms mentioned above.

Referring to FIG. 2B, when in the extended state, the patch panel 200 may further include a filler plate 280 adapted to fill a gap 281 that is defined between the first and second adapters 216, 217 when the first and second adapters 216, 217 are in the second position (i.e., extended). The filler plate 280 is positioned over a top of the gap 281 and be affixed by fasteners to the adapters 216 and 217 or to the support member 210. The filler plate 280 may alternatively extend over the front and/or bottom of the gap 281 between the adapters 216 and 217.

Although the embodiments depicted and described herein include a single adapter and a double adapter configuration, any number of adapters may be positioned in a support member and arranged either horizontally or stacked vertically to form rows and columns of adapters. Such a plurality of adapters may be arranged in a single support member or a plurality of support members. Furthermore, it is envisioned that a stack of adapters within a support member may have a pivot and/or retainer(s) positioned between some of the adapters within the stack (e.g., a spring-loaded element may be placed on a first adapter and an associated element receptor placed on a second adapter that is stacked proximate the first adapter having the spring-loaded element).

Accordingly, a reconfigurable patch panel for use with electronic equipment and capable of being reconfigured from one position to another to accommodate particular space and/or cabling constraints is defined above by various embodiments of the present invention. Through the use of the reconfigurable patch panel, floor space of equipment racks can be minimized or effectively utilized, lengths of the inter-equipment cables connecting between communications equipment can be reduced, and one or more pieces of the electronic equipment can be logically collocated.

Furthermore, in the case of proximately positioning the racks to one another, proper cable management paradigms can be achieved by using the patch panel of the present invention for (i) efficiently routing the inter-equipment cables to minimize or effectively utilize space occupied by such cables, (ii) preventing damage or unexpected displacement of the inter-equipment cables, (iii) avoiding excessive cable bending or other external forces that may damage the inter-equipment cables and/or their associated terminations.

While the foregoing is directed to embodiments of the present invention, other and further embodiments of the invention may be devised without departing from the basic scope thereof, and the scope thereof is determined by the claims that follow.

What is claimed is:

1. An apparatus comprising:
   a support member having an opening configured to house an adapter within the opening, at least one pivot, and at least one retainer;
   at least one adapter comprising a plurality of ports for coupling to electric signal bearing cables;
   a pivot fastener configured to attach to the support member and to the adapter at the at least one pivot;
   a retainer fastener configured to attach to the support member and to the adapter at the at least one retainer;
   wherein the pivot fastener is configured to allow the adaptor to rotate selectively about the pivot fastener to a first position relative to the support member in which the adapter is substantially inside the opening of the support member such that the adapter is housed substantially within the support member and to a second position relative to the support member in which the adapter is substantially outside of the opening of the support member; and
   wherein the retainer fastener is configured to fix the at least one adapter to the support member and to retain the adapter in the first or second position.

2. The apparatus of claim 1, wherein the support member forms a frame configured to support the adapter and configured to substantially contain the adapter within the frame when the adapter is retained in the first position.

3. The apparatus of claim 2, wherein in the first position a front portion of the adapter is coplanar with respect to a front edge of the support member and wherein the adapter is configured to pivot to the second position about the pivot fastener such that the adapter is substantially outside of the opening and that the front portion of the adapter is a planer surface that is at an angle with respect to the front edge of the support member.

4. The apparatus of claim 1, wherein the support member comprises a plurality of retainers, and further comprising a plurality of retainer fasteners configured to attach to the support member and the adapter at each of the plurality of retainers of the support member.

5. The apparatus of claim 1, wherein the retainer fastener is configured to releasably fix the adapter such that the adapter is substantially housed within the support member when in the first position.

6. The apparatus of claim 5, wherein in the first position, the at least one adapter is in a non-extended state and in the second position, the at least one adapter is in an extended state.

7. The apparatus of claim 1, wherein the pivot fastener is configured to be removable from the at least one pivot and wherein the retainer fastener is configured to be removable from the at least one retainer.

8. The apparatus of claim 1, wherein the retainer fastener comprises at least one of a screw configured to be received within a threaded hole at the retainer or a spring-loaded element configured to be received within an element receptor at the retainer.

9. The apparatus of claim 1, and further comprising a plurality of adapters arranged in a side-by-side configuration and a plurality of pivot fasteners, the support member comprising a plurality of pivots each configured to enable a corresponding adapter to pivot between the first position and the second position about a corresponding one of the plurality of pivot fasteners at the plurality of pivots.

10. The apparatus of claim 9, wherein each of the plurality of adapters is configured to pivot from the first position to the second position about the plurality of pivot fasteners, and wherein in the first position, a front portion of each adapter is coplanar with respect to a front edge of the support member and in the second position, the front portion of each adapter forms a planer surface that is at an angle with respect to the front edge of the support member.

11. The apparatus of claim 10, wherein in the second position, the front portion of a first adapter is at an obtuse angle with respect to the front portion of a second adapter.

12. The apparatus of claim 11, and further comprising a first retainer fastener pair configured to retain the first adapter in the first position substantially inside the opening of the support member and to retain the first adapter in the second position substantially outside the opening of the support member, and a second retainer fastener pair configured to retain the second adapter in the first position substantially inside the opening of the support member and to retain the second adapter in the second position substantially outside the opening of the support member.

13. The apparatus of claim 10, further comprising a plurality of filler plates that reside in a plurality of gaps formed between the adapters, and a plurality of filler plate fasteners configured to attach to the support member, the adapter and the plurality of filler plates, wherein the filler plates are affixed to the adapters and the support member by the plurality of filler plate fasteners.

14. The apparatus of claim 9, wherein the adapter is configured to pivot to the second position about only one of the plurality of pivot fasteners.

15. A method of reconfiguring a patch panel comprising:
releasing a first of a plurality of retainer fasteners from a first of a plurality of retainers, wherein the first of the retainer fasteners is configured to attach to a support member and to a first of a plurality of adapters at the first of the plurality of retainers, the support member having an opening configured to house the adapter substantially within the opening in a first position;
pivoting the first adapter about a first of a plurality of pivot fasteners configured to attach to the support member and the adapter at a first of a plurality of pivots, wherein the adapter is pivoted to a second position about the first pivot fastener such that the adapter is substantially outside the opening of the support member; and
affixing the first retainer fastener to the first retainer to fix the first adapter to the support member in order to retain the first adapter in the second position.

16. The method of claim 15, wherein pivoting comprises pivoting the first adaptor about the first pivot fastener to the first position to align a front portion of the first adapter coplanar with a front edge of the support member and pivoting the first adaptor about the first pivot fastener to the second position to align the front portion of the first adapter at an angle relative to the front edge of the support member.

17. The method of claim 16, wherein pivoting comprises pivoting the first adapter to the first position that places the first adapter substantially inside the opening of the support member.

18. The method of claim 16, wherein pivoting comprises pivoting the first adapter to the second position about only one of the plurality of pivot fasteners.

19. The method of claim 15, further comprising:
releasing a second of the plurality of retainer fasteners from a second of the plurality of retainers, wherein the second of the retainer fasteners is configured to attach to the support member and a second of the plurality of adapters at the second of the plurality of retainers;
pivoting the second adapter to the second position about a second of the plurality of pivot fasteners configured to attach to the support member and the second adapter at a second of the plurality of pivots; and
affixing the second retainer fastener to the second retainer to fix the second adapter to the support member in order to retain the second adapter in the second position.

20. The method of claim 19, wherein the pivoting comprises pivoting the second adapter about the second pivot fastener to the first position to align a front portion of the second adapter coplanar with a front edge of the support member and pivoting the second adapter about the second pivot fastener to the second position to align the front portion of the second adapter at an angle relative to the front edge of the support member.

21. The method of claim 20, wherein pivoting comprises pivoting the first and second adapters to the second position such that the front portion of the first adapter is at an obtuse angle with respect to the front portion of the second adapter.

22. An apparatus comprising:
a support member having an opening configured to house an adapter within the opening, at least a first pivot and a first retainer pair;
a first adapter comprising a plurality of ports for coupling to electric signal bearing cables;
a first pivot fastener configured to attach to the support member and to the first adapter at the first pivot;
a first retainer fastener pair configured to attach to the support member and to the first adapter at the first retainer pair;
wherein the first pivot fastener is configured to allow the first adaptor to rotate selectively about the first pivot fastener to a first position substantially inside the opening of the support member and a second position substantially outside the opening of the support member; and
wherein the first retainer fastener pair is configured to fix the first adapter to the support member and to retain the first adapter in the first or second position.

23. The apparatus of claim 22, wherein the support member comprises a second pivot and a second retainer pair, and further comprising a second pivot fastener configured to attach to the support member and the first adapter at the second pivot, a second adapter and a second retainer fastener pair, wherein the second adapter is configured to rotate about the second pivot fastener at the second pivot between the first and second positions, and the second retainer fastener pair being configured to attach to the support member and to the second adapter at the second retainer pair to retain the second adapter in the first position substantially inside the opening of the support member and to retain the second adapter in the second position substantially outside the opening of the support member, and wherein the first retainer fastener pair and the second retainer fastener pair are configured so that a front portion of the first adapter is at an obtuse angle with respect to a front portion of the second adapter when the first and second adapters are in their second positions.

* * * * *